Jan. 26, 1937.   R. K. JEFFREY   2,068,802
CUTTER CHAIN
Filed June 7, 1934
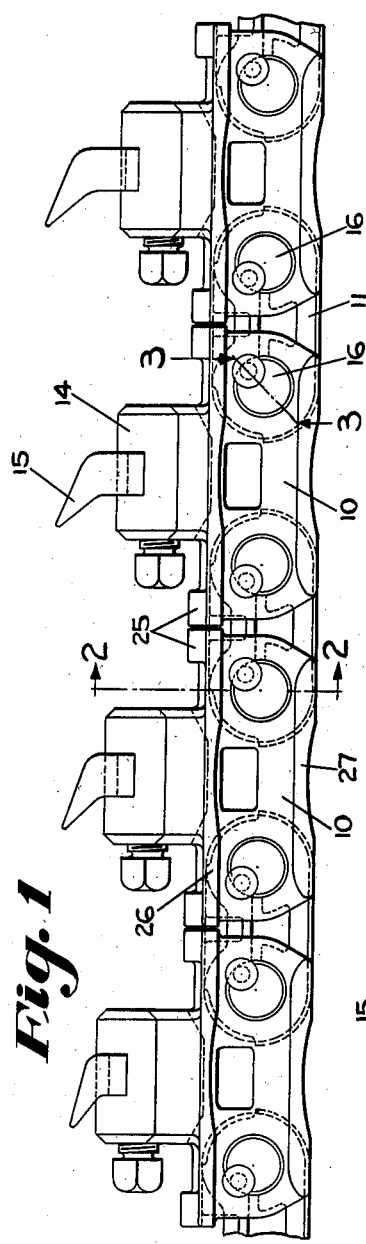
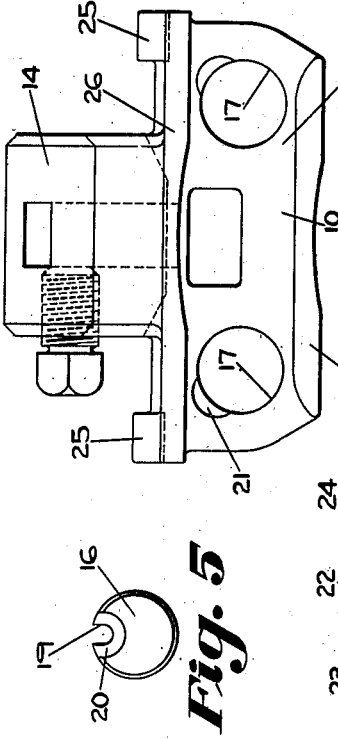
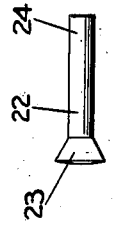
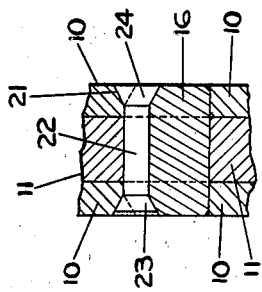
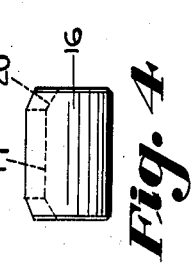
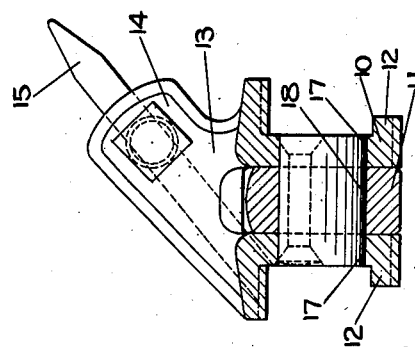
INVENTOR:
Robert K. Jeffrey,
By
Cushman, Darby Cushman
ATTYS.

Patented Jan. 26, 1937

2,068,802

UNITED STATES PATENT OFFICE 2,068,802

CUTTER CHAIN

Robert K. Jeffrey, Columbus, Ohio, assignor to The Jeffrey Manufacturing Company, a corporation of Ohio Application June 7, 1934, Serial No. 729,523

6 Claims. (Cl. 262—33)

The present invention relates to cutter chains for mining machines.

Objects of the invention are, to provide a cutter chain having the links thereof so designed with respect to each other as to resist any tendency of the links toward tilting or turning upon a transverse axis; and to provide a pintle construction for holding adjacent links securely connected, which pintle construction may be used with chains of general application.

Other objects and advantages of the invention will be apparent from the following specification and drawing, wherein:

Figure 1 is an elevation of the cutter chain;

Figure 2 is a transverse sectional view taken on the line 2—2 of Figure 1;

Figure 3 is a transverse sectional view taken on the line 3—3 of Figure 1;

Figure 4 is a side view of the pintle used in the present invention;

Figure 5 is an end view of the pintle;

Figure 6 is a side elevation of a pin used with the pintle; and

Figure 7 is a side elevation of a bit carrying link used in the chain.

The cutter chain of the present invention is formed of bit carrying links 10 and connecting links 11, the bit carrying links being of the bridged type, that is, being substantially U-shaped in cross section and including side bars or plates 12 which are joined at their outer ends by a bridging portion 13 which includes a bit carrying lug 14, in which a bit 15 may be secured in any suitable manner. The connecting links 11 are positioned within the ends of adjacent bit carrying links 10 as shown in Figures 1 and 2 and are pivotally secured to the latter links by pintles 16 extending through aligned apertures 17 in the bars of the bit carrying links and an aperture 18 in the connecting links 11.

As is best shown in Figure 5, each pintle 16 is provided with a longitudinal slot or groove 19 opening from the periphery of the pintle. The slot 19 is countersunk as shown at 20 at both ends thereof. It will be noted from Figure 5 that the slot 19 is substantially U-shaped and the same is true of the countersink 20 at the ends of the slot.

The bars 12 of the bit carrying link 10 have an arcuate and tapered depression or inclined slot 21 opening into the ends as shown in Figures 2 and 7. By this arrangement, when the bit carrying links 10 and connecting links 11 are positioned with their respective apertures 17 and 18 in alignment, a pintle 16 may be inserted in these apertures and positioned with its slot 19 and countersink 20 opposite the slot 21 in each bar 12 of the bit carrying link. A pin 22 may then be inserted in the slot 19 with the tapered head 23 of the pin seated in the countersink 20 and slot of one bar 21. The opposite end 24 of the pin can then be headed to fit into the countersink 20 and slot 21 on the opposite bar 12 of the link 10.

It will be noted that, by the above arrangement, the body of the pin 22 is entirely within the pintle and that the entire diameter of the pintle is in shear. Ordinarily, the pintle or rivet used to join adjacent links is flanged at its ends and of reduced diameter intermediate its length. The flanged ends of the pintle cannot be of too great a diameter, since they would then require a large aperture and the strength of the side bars of the link would be reduced. The result is that the intermediate portion of the pin must also be of a limited diameter. By the present arrangement, since the pintle is of constant diameter, maximum strength will be afforded throughout its length. The headed portions at the ends of the pin 22 will fully serve the purpose of holding the pintle in position in the links.

The pin 22 serves to keep the pintle from rotating, this by reason of the fact that its headed ends extend into the slots 21 of the bit carrying link. The construction described above enables the pintle 16 to be of maximum effective diameter without in any way increasing the size of the links. The pins 22 are preferably of relatively soft metal and may therefore be drilled out and readily replaced.

It will be obvious that the pintle structure of the present invention may be used with chains of other types than cutter chains.

The pintle construction provided by the present invention is so designed that the pintles will be held against rotation with respect to the bit carrying links. As a result of this, the bit carrying links will not be subjected to wear which would otherwise occur at the pintle. The connecting links or the pintles themselves will take all the wear which might result from strain or turning movement relative to the pintles. Obviously, the connecting links can be replaced much more economically than the bit carrying links.

The bit carrying links 10 are provided at each end thereof with shoulders or abutments 25 bridging their side bars 12 and when the chain is assembled, as shown in Figure 1, the abutments 25 at adjacent ends of bit carrying links 10 will be substantially in contact. This construction is provided for the purpose of preventing a link from being sharply tilted or turned on a transverse axis when its bit 15 encounters a hard body of coal in the seam.

By the above arrangement, when any one bit carrying link 10 tends to tilt, the abutments 25 at each end thereof will come into contact with the corresponding abutments of the adjacent bit carrying links with the result that while the first link and the adjacent links may tend to rise slightly in the cutter bar in which the chain moves, none of them will tilt with respect to the cutter bar. It will be appreciated that the abutting action may be transmitted through a number of adjacent links in the chain, each successive link further resisting the tendency of the other links to tilt.

The bit carrying links 10 are provided with flanges 26 at the outer ends of the side bars 12 (the upper ends in Figure 1) and with gibs 27 at their inner ends. The flanges 26 are intended to bear upon the outer ends of the cutter bar flanges and the gibs 27 will move in grooves in the cutter bar to hold the chain in the latter.

The general structure of the bit carrying link shown in Figure 7, and the chain as a whole, of Figure 1, without regard to the particular chain and fastening means, is the invention of Nils D. Levin, and is disclosed and claimed in his application for a Cutter chain, Serial No. 729,713, filed June 8, 1934.

It will be understood that the invention is not limited to the details of construction shown in the drawing and described in the specification and that the example of the use of the invention which has been given does not include all of the uses of which it is capable; also, that the phraseology employed in the specification is for the purpose of description and not of limitation.

I claim:

1. The combination in a cutter chain for mining machines, of bit carrying links including side bars, connecting links positioned within the side bars of the bit carrying links, the connecting links and the side bars of the bit carrying links being provided with aligned apertures coincidental in size, a pintle corresponding in diameter to the diameter of the apertures positioned in the aligned apertures, the pintle being provided with a longitudinally extending peripheral groove, the periphery of each aperture in the bit carrying link having a notch therein, and a member extending through the groove in the pintle and having its end extending into the notch to hold the pintle against rotation.

2. The combination in a cutter chain for mining machines, bit carrying links and connecting links, said bit carrying links being formed to straddle the connecting links, said links being provided with aligned apertures extending therethrough, a pintle seated in the aligned apertures, and removable means extending longitudinally of the pintles to hold the pintles against rotation with respect to the bit carrying links, said pintle and said means having their ends flush with the outer surfaces of the bit carrying links.

3. The combination in a cutter chain for mining machines, bit carrying links and connecting links, said bit carrying links being formed to straddle the connecting links, said links being provided with aligned apertures extending therethrough, a pintle seated in the aligned apertures, and removable means extending longitudinally of the pintles and engaging the periphery of the same to hold the pintles against rotation with respect to the bit carrying links, said pintle and said means having their ends flush with the outer surfaces of the bit carrying links.

4. The combination in a cutter chain for mining machines, of bit carrying links and connecting links, said bit carrying links being formed to straddle the connecting links, said links being provided with aligned apertures therethrough coincidental in size, a pintle of a size corresponding with the size of the apertures positioned in the aligned apertures, and means extending longitudinally of the pintles to hold the pintle against rotation, said pintle and said means having their ends flush with the outer surfaces of the bit carrying links.

5. The combination in a cutter chain for mining machines, of bit carrying links and connecting links, said bit carrying links being formed to straddle the connecting links, said links being provided with aligned apertures therethrough coincidental in size, a pintle of a size corresponding with the size of the apertures positioned in the aligned apertures, and means extending longitudinally of the pintles and engaging the periphery of the same to hold the pintle against rotation, said pintle and said means having their ends flush with the outer surfaces of the bit carrying links.

6. The combination in a cutter chain for mining machines, of bit carrying links including side bars, connecting links positioned within the side bars of the bit carrying links, the connecting links and the side bars of the bit carrying links being provided with aligned apertures coincidental in size, a pintle corresponding in diameter to the diameter of the apertures positioned in the aligned apertures, the pintle being provided with a longitudinally extending peripheral groove, the periphery of each aperture in the bit carrying link having a notch therein, and a member extending through the groove in the pintle and having its end extending into the notch to hold the pintle against rotation, the ends of said pintle and said member lying flush with the outer surfaces of said side bars.

ROBERT K. JEFFREY.